(12) United States Patent
Masci

(10) Patent No.: US 11,126,881 B2
(45) Date of Patent: Sep. 21, 2021

(54) METHOD FOR THE RECOGNITION OF OBJECTS FOR AUGMENTED REALITY ENGINES BY MEANS OF AN ELECTRONIC DEVICE

(71) Applicant: The Edge Company S.R.L., Rimini (IT)

(72) Inventor: Fabio Masci, Rimini (IT)

(73) Assignee: THE EDGE COMPANY S.R.L., Rimini (IT)

( * ) Notice: Subject to any disclaimer, the term of this patent is extended or adjusted under 35 U.S.C. 154(b) by 153 days.

(21) Appl. No.: 16/475,341

(22) PCT Filed: Jan. 30, 2018

(86) PCT No.: PCT/IT2018/000012
§ 371 (c)(1),
(2) Date: Jul. 1, 2019

(87) PCT Pub. No.: WO2018/138745
PCT Pub. Date: Aug. 2, 2018

(65) Prior Publication Data
US 2019/0340457 A1 Nov. 7, 2019

(30) Foreign Application Priority Data

Jan. 30, 2017 (IT) .................. 102017000009585

(51) Int. Cl.
*G06K 9/00* (2006.01)
*G06K 9/32* (2006.01)
(Continued)

(52) U.S. Cl.
CPC .............. *G06K 9/3233* (2013.01); *G06T 7/75* (2017.01); *G06T 19/006* (2013.01); *G06T 2207/20092* (2013.01); *G06T 2207/30244* (2013.01)

(58) Field of Classification Search
CPC ....... G06T 7/521; G06T 2200/08; G06T 7/55; G06T 2207/10012; G06T 17/00;
(Continued)

(56) References Cited

U.S. PATENT DOCUMENTS

| 2002/0154812 A1* | 10/2002 | Chen | G06T 3/4038 382/154 |
| 2005/0068316 A1* | 3/2005 | Endo | G06T 15/10 345/419 |
| 2015/0091905 A1* | 4/2015 | Wang | G06T 19/00 345/427 |

FOREIGN PATENT DOCUMENTS

WO 2014048475 A1 4/2014

OTHER PUBLICATIONS

International Search Report and Written Opinion dated Jun. 12, 2018 for counterpart PCT Application No. PCT/IT2018/000012.
(Continued)

*Primary Examiner* — Alex Kok S Liew
(74) *Attorney, Agent, or Firm* — Shuttleworth & Ingersoll PLC; Timothy Klima

(57) ABSTRACT

A method for the recognition of real objects, in particular three-dimensional objects, for augmented reality engines comprises the steps of: producing at least one three-dimensional drawing of the real object; defining at least one characteristic measurement of the real object starting from the three-dimensional drawing; entering in an electronic device said at least one characteristic measurement of the real object; positioning the electronic device in such a way as to view the real object; detecting an image of the real object in the electronic device; superposing said at least one characteristic measurement of the real object on the image detected; aligning said at least one characteristic measurement of the real object with the image detected in such a way
(Continued)

as to determine the positioning of the electronic device relative to the real object.

11 Claims, 3 Drawing Sheets

(51) Int. Cl.
*G06T 7/73* (2017.01)
*G06T 19/00* (2011.01)

(58) Field of Classification Search
CPC ... G06T 7/75; G06T 7/73; G06T 2207/10032; G06T 2207/30184; G06T 7/30; G06T 7/593; G06T 15/20; G06T 17/05; G06T 2207/10028; G06T 2207/30004; G06T 2210/41; G06T 7/0012; G06T 7/12; G06T 7/344; G06T 7/80; G06T 1/20; G06T 2200/24; G06T 2207/30204; G06T 2210/56; G01B 11/2513; G01B 11/25; G01B 11/2545; G01B 11/2518; G01B 21/02; G01B 9/02023; G01B 9/02029; G01B 9/0203; G01B 9/02031; G01B 9/0205; G01B 11/02; G01B 11/24; H04N 2013/0081; H04N 13/239; H04N 13/246; H04N 13/111; H04N 13/296; H04N 13/189; H04N 13/194; H04N 13/167; H04N 13/20; H04N 13/221
See application file for complete search history.

(56) References Cited

OTHER PUBLICATIONS

Mohr, et al; "Retargeting Technical Documentation to Augmented Reality", Human Factors in Computing Systems, ACM, 2 Penn Plaza, Suite 701 New York NY 10121-0701 USA, Apr. 18, 2015, pp. 3337-3346, XP058068382, DOI: 10.1145/2702123.2702490; ISBN: 978-1-4503-3145-6.

Zhiwei et al; "AR-mentor: Augmented reality based monitoring system", 2014 IEEE International Symposium on Mixed and Augmented Reality (SMAR), IEEE, Sep. 10, 2014, pp. 17-22, XP032676200, DOI: 10.1109/1SMAR.2014.6948404.

* cited by examiner

METHOD FOR THE RECOGNITION OF OBJECTS FOR AUGMENTED REALITY ENGINES BY MEANS OF AN ELECTRONIC DEVICE

This application is the National Phase of International Application PCT/IT2018/000012 filed Jan. 30, 2018 which designated the U.S.

This application claims priority to Italian Patent Application No. 102017000009585 filed Jan. 30, 2017, which application is incorporated by reference herein.

TECHNICAL FIELD

This invention relates to a method for the recognition of objects, in particular three-dimensional objects, for augmented reality engines, by means of an electronic device, preferably portable, and also relates to a computer program and to an electronic device. This invention also relates to a method and a system for interactive viewing and management of augmented reality content.

Augmented Reality (AR) is a technology that allows the combination of digital data generated by an electronic device with the real environment. By means of augmented reality engines, information linked to a particular real object becomes interactive and human sensory perception is enhanced, acting by means of real-time superposing and modification of the flow of information arriving from an image detector, for example a camera. This happens by means of algorithms for the recognition of real objects that allow alignment of the object generated by the computer with the actual object.

At present, augmented reality engines have many applications.

One application of interest is that relating to teaching and training, for which starting with recognition of a real object about which teaching or training must be carried out, the electronic device generates a series of information that is overlaid (superposed) on the real object and allows interaction with the image of the real object created by the electronic device.

In applications of this type, recognition of the real object is fundamental.

BACKGROUND ART

At present there are several prior art object recognition systems. Most are based on detecting an image of the object by means of a camera or a video camera inserted in the electronic device. The image detected in that way must be recognised by the program loaded in the electronic device in order to activate the augmented reality. However, that type of recognition is only effective if the real object is two-dimensional, for example a drawing, or a two-dimensional image, such as a photograph, of the self-same object, or a three-dimensional object having a regular shape. If the program is unable to recognise the image and therefore to combine it with that contained in the augmented reality engine, then augmented reality is not activated. Moreover, that type of recognition only functions if the camera frames the object, but not if the camera moves relative to the object in such a way that it cannot view it.

Therefore, it remains a system linked to the recognition of individual objects and not to the recognition of objects that extend in an environment.

There are alternative image recognition systems which are based on the detection and recognition of markers, that is to say, two-dimensional symbols located on the object. However, this system too has the limit of having to continuously view the marker in order to activate the augmented reality engine.

In order to allow the camera to be moved relative to the object and, therefore, to have available augmented reality content while the object is not viewed, there are prior art systems based on "extended markers". During the movement of the electronic device relative to the object, such systems create successive references that allow the marker to not have to be continuously viewed. These systems also have problems, since they must in any case start from a marker and, moreover, while translating the camera or moving relative to the object in such a way that the marker is no longer seen, the image generated by the computer tends to no longer correctly align with the image of the real object. In use, the augmented reality content is activated but is no longer aligned with the image of the real object.

DISCLOSURE OF THE INVENTION

The aim of this invention is to allow an augmented reality engine to be activated starting from the detection of the real object, irrespective of the shape of the object or the presence of a marker.

A further aim of this invention is to allow optimum alignment of the augmented reality image with the image of the real object.

The invention achieves those aims thanks to a method for the recognition of objects, in particular three-dimensional objects, for augmented reality engines with characteristics as disclosed herein.

Advantageously, the electronic device, preferably smartglasses, or a tablet or a smartphone, comprises a data entry interface, the interface being provided with elements, preferably of the "touch" type, for adjusting the alignment. In that way, it is possible to translate the device in such a way that the real object is no longer viewed and continue having optimum superposing of the augmented reality image on the image of the real object.

BRIEF DESCRIPTION OF THE DRAWINGS

Further advantages and features of this invention are more apparent in the detailed description which follows, with reference to the accompanying drawings, which illustrate an example of it without limiting the scope of the invention, in which.

DETAILED DESCRIPTION OF PREFERRED EMBODIMENT OF THE INVENTION

Figure 1:
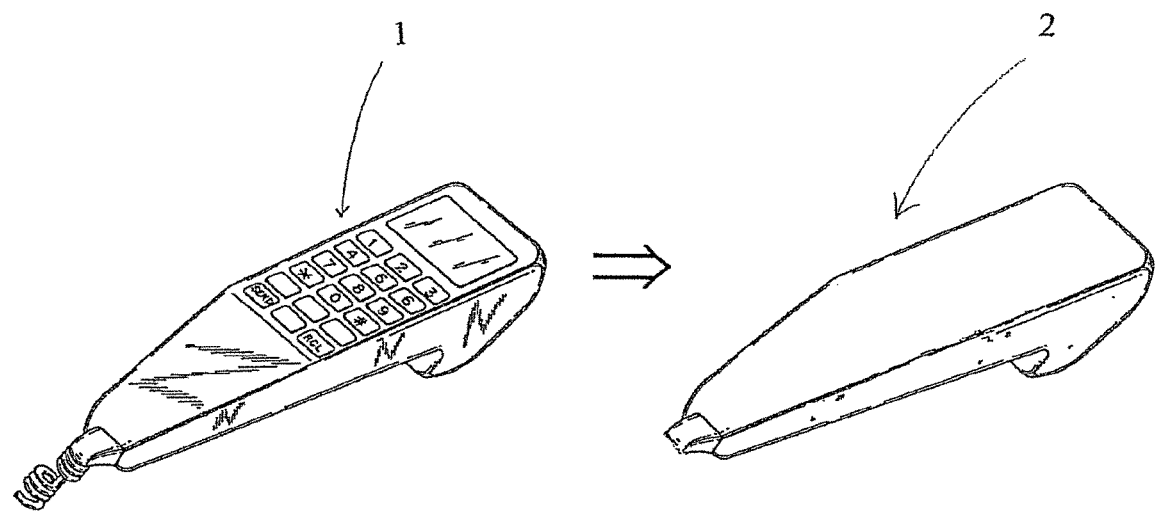
FIG. 1 illustrates an example embodiment of a first step of the method according to this invention.

In FIG. 1 the numeral 1 denotes a real object, having any shape, in particular a three-dimensional object, on which content is to be applied by means of an augmented reality engine. According to this invention, starting from the object 1 at least one three-dimensional drawing 2 is produced.

Figure 2:
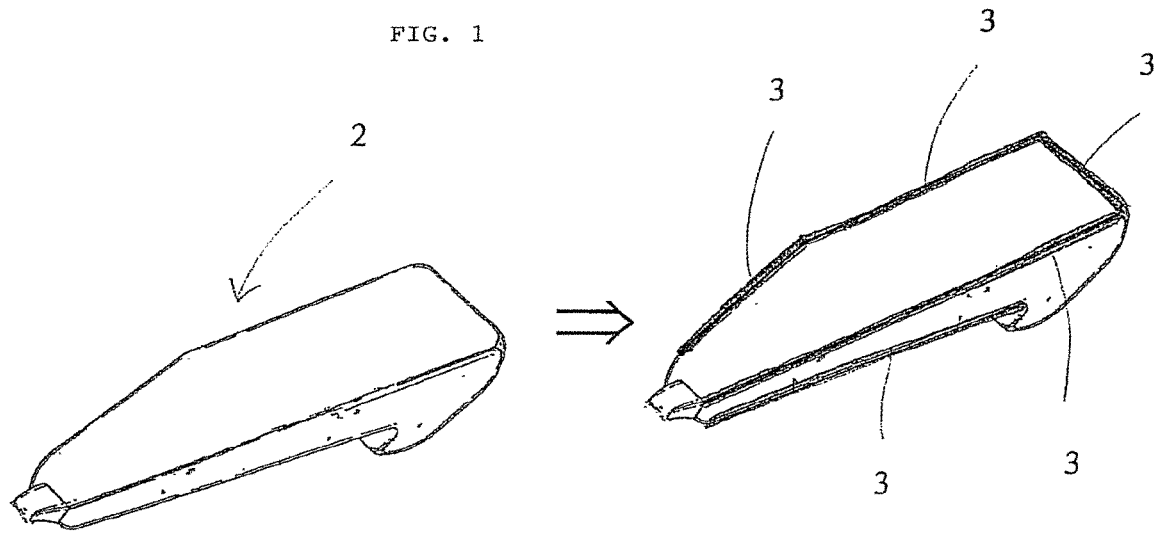
FIG. 2 illustrates a subsequent step of the method according to this invention.

As illustrated in FIG. 2, starting from the three-dimensional drawing 2 at least one characteristic measurement 3 of the object 1 is defined. In the case of the example illustrated, based on the three-dimensional drawing 2, five characteristic measurements are defined.

Figure 3:
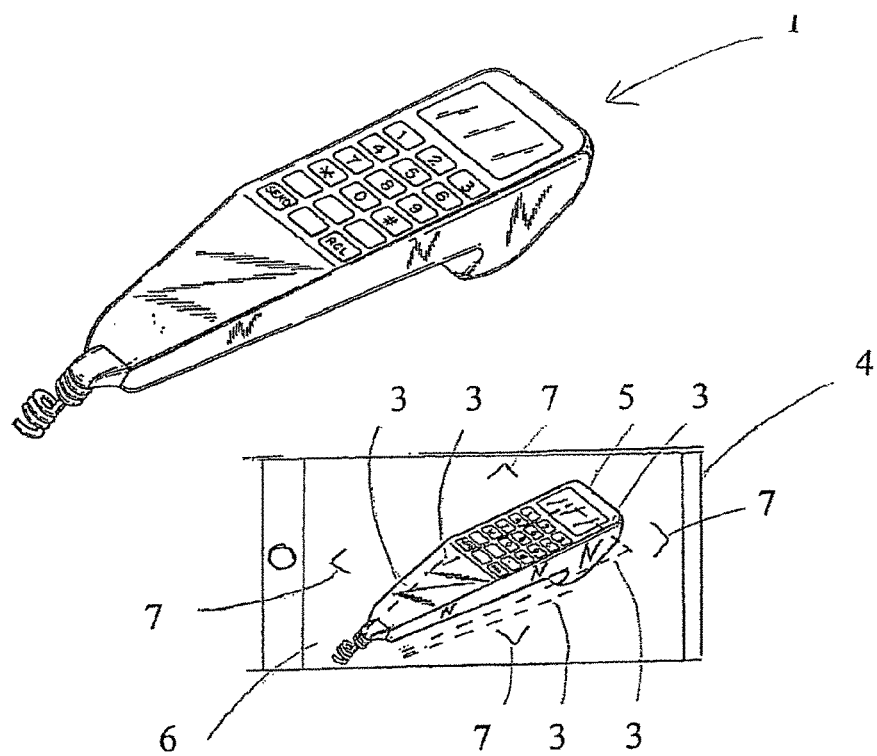
FIG. 3 illustrates a further step of the method according to this invention.

FIG. 3 illustrates the steps of the method according to the invention, which comprise positioning an electronic device 4 in such a way as to view the object 1 and detecting an image 5 of the object 1. The electronic device 4 is preferably smartglasses. As shown in FIG. 3, it may also be a tablet or a smartphone. The object 1 is framed for example using a camera or video camera, usually inserted in the electronic device 4. In this way, an image 5 of the real object is detected. The image 5 is simply viewed on the electronic device 4 without any processing of the image. According to the invention, the characteristic measurement or the characteristic measurements 3 of the object 1 which were defined starting from the drawing 2 are superposed on the image detected 5. This step also does not involve any processing of the image detected 5, but simply superposing of the characteristic measurement or of the characteristic measurements 3 on the image.

Figure 4:
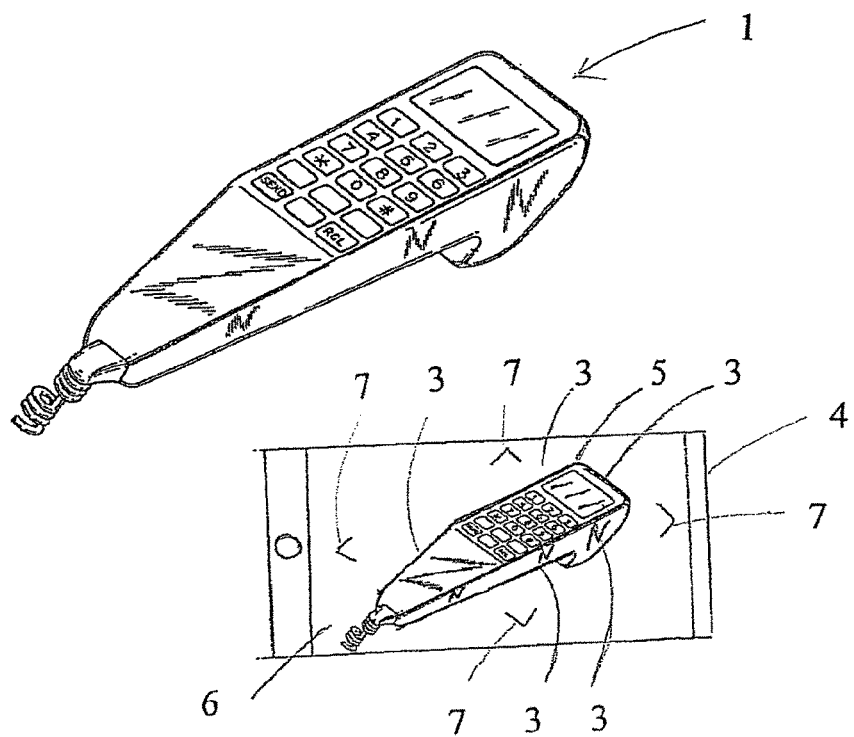
FIG. 4 illustrates a subsequent step of the method according to this invention.

As shown in FIG. 4, according to the invention the characteristic measurement or measurements 3 are aligned with the image 5 of the object 1 detected by the video camera, in such a way as to determine the positioning of the electronic device 4 relative to the object 1, allowing activation of the augmented reality engine. Therefore, there is no need for recognition of the image of the real object, which for objects having a complex shape could be difficult, in order to activate the augmented reality engine. Unlike the prior art systems, the real object 1 is recognised without any processing of the image detected 5, but instead by means of alignment of the characteristic measurement or characteristic measurements 3 with the image 5 viewed on the device 4. Depending on the alignment of the characteristic measurement or characteristic measurements 3 with the image 5, a corresponding augmented reality content is associated with the real object 1. Moreover, the alignment of the characteristic measurements 3 with the image 5 allows activation of the augmented reality engine with optimum positioning of the augmented reality content relative to the real object. Even the positioning does not require processing of the image of the object, but simply viewing of the object on the electronic device 4.

The method according to this invention also allows the electronic device 4 to be moved relative to the real object 1 while avoiding losing the alignment of the augmented reality image relative to the detected image 5 of the real object 1. In fact, the alignment of the characteristic measurements 3 of the object 1 with the detected image 5 allows definition of the positioning of the electronic device 4 relative to the object 1 and, therefore, recalculation of the position of the augmented reality image and the detected image 5 relative to one another even when the camera or video camera moves and no longer frames the real object 1.

In order to recalculate that position, an Inertial Measurement Unit, IMU, may be used. This uses sensors such as a gyroscope, accelerometer, compass, GPS, and if necessary magnetometers for detecting movements.

Advantageously, as illustrated in FIGS. 3 and 4, the electronic device 4 comprises a data entry interface 6, provided with elements 7, in particular of the "touch" type, for adjusting the alignment. The adjustment may also be made using "track pad" or "gesture" type elements.

The adjustment may be made by holding the electronic device 4 in such a way that it frames the real object 1.

In this case, the first alignment of the characteristic measurements 3 with the image 5 of the real object 1 occurs by moving the electronic device 4 relative to the real object 1. However, it is possible for the user to adjust the alignment manually by means of the "touch" elements 7 for increased precision.

The adjustment is particularly advantageous when the electronic device 4 is moved to frame different elements of an environment in which a user wants to apply augmented reality content. In this case, automatic alignment, which is performed by means of sensors, may not be optimum and may, therefore, be improved by acting on the "touch" elements 7 of the interface 6 of the electronic device 4.

The recognition method according to this invention in any case allows operation of the electronic device in augmented reality even with sources different from the real object, such as a photograph of the object or a reconstruction of it, or a marker. In fact, the image is detected by means of a simple camera or video camera, as also occurs in the usual systems, although in those systems the image must be processed in order to active the augmented reality engine.

Compared with the usual systems, recognition of the object by means of the method according to this invention always allows movement of the electronic device relative to the real object while maintaining the alignment between the augmented reality overlay and the detected image.

One advantageous application of the method according to this invention relates to the field of training and high level technical professional activities such as the maintenance of aircraft and of mechanical vehicles in general, activities that require operations to be performed in accordance with rigorous and definitive patterns and sequences.

Currently, in the training sector this type of activity is carried out using different methods and tools such as on the job training, e-learning, etc. In the maintenance sector, despite the widespread nature of computer systems, the use of paper copy tools is still prevalent. In this case, augmented reality provides a new learning space, combining digital teaching materials with tools and objects that are part of the physical space.

The possibility of carrying out maintenance training in a "virtual" environment is advantageous economically (e.g.: there is no need to keep an aeroplane from flying in order to train workers) and in terms of safety (it will be possible to move on to physically performing the operation only after having repeated it multiple times). The possibility of being able to re-try a predetermined action without interruptions increases the effectiveness of the operations.

According to that advantageous application, the method comprises a step of creating augmented reality manuals and teaching content which are entered in a server, accessible to a user by means of the electronic device, if necessary using login credentials.

The method also comprises both simple access to such data and content, and their modification, again via the electronic device, depending on the mode selected by the user. There may be multiple modes: the user can simply "navigate" to familiarise himself or herself with the system, can access the augmented reality content in a "learning" type mode, can use a "training" mode to carry out augmented reality training and receive a "Key Performance Indicator" that is monitored by the system, or can carry out guided maintenance activities while receiving instructions directly projected onto the object or component on which he or she is working, in such a way as to have his or her hands free while receiving the instructions and confirming execution of the step so as to view the next.

In one example embodiment, the user downloads to the electronic device a program from a website accessible for example by means of login credentials.

Then he or she selects one of the different modes (simple navigation, learning, training, guide) and selects the subject.

Then the user frames the object, which is recognised by means of superposing and alignment with the detected image of the characteristic measurements defined starting from the three-dimensional drawing of the object.

Then the corresponding landmark defined in the manual is associated with the image detected and recognised. After that, for example by means of "touch" mode on the icons in overlay, the associated multimedia content is activated. There may be different levels of augmented reality present, for example the icons in overlay are activated when the image is recognised and the multimedia content which is activated by selecting the icon.

It is also possible to enter an "Optical Character Recognition" (OCR) module in the program, for recognising a text and activating the associated content.

The method according to this invention allows activation of the content even when the focus is removed from the physical object previously framed. This is particularly advantageous in the case of learning or a guide on different elements that extend in the space, for example the cockpit of an aeroplane, since it allows a user to view different elements of the cockpit while keeping the augmented reality content active for a first element framed.

In an advantageous embodiment, the method comprises the possibility of modifying the content of the manuals, with the entry and modification of overlays and landmarks, depending on the mode selected.

Figure 5:
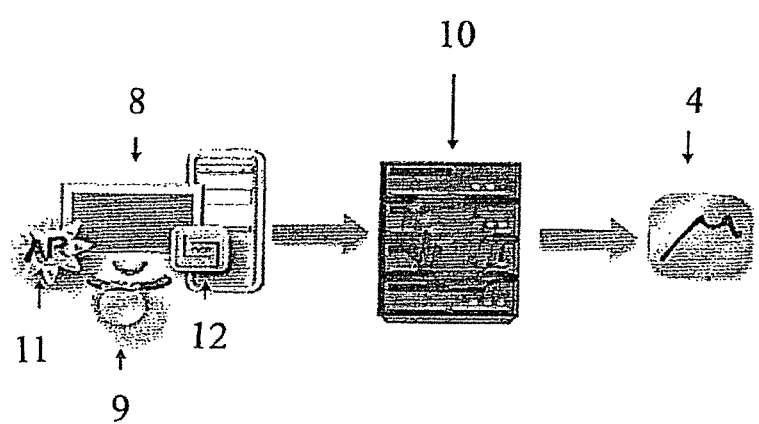
FIG. 5 schematically illustrates a preferred embodiment of a system for interactive viewing and management of augmented reality content that uses the recognition method according to this invention.

FIG. 5 schematically illustrates the main components of a system that allows implementation of the method described.

The numeral 8 generically indicates a server containing the program 9 for creating content, 10 denotes a Database Management System (D.B.M.S.) for data management, and 4 denotes the electronic device, preferably portable, on which it is possible to download from the server a mobile application for viewing and modifying the augmented reality content. The numeral 11 denotes the interface with the recognition module for augmented reality which implements the method according to this invention. The numeral 12 is used to label the interface with the OCR (Optical Character Recognition) module. Those modules are contained in the server and may be downloaded together with the mobile application. The mobile application can be used to access the content in the server.

The invention claimed is:

1. A method for interactive viewing and management of augmented reality, comprising the steps of:
    producing a three-dimensional drawing of a real object;
    defining at least one characteristic measurement of the real object starting from the three-dimensional drawing;
    entering in an electronic device the at least one characteristic measurement of the real object;
    positioning the electronic device in such a way as to view the real object;
    detecting an image of the real object in the electronic device;
    superposing the at least one characteristic measurement of the real object on the image detected;
    aligning the at least one characteristic measurement of the real object with the image detected in such a way as to determine a positioning of the electronic device relative to the real object;
    inserting an augmented reality engine in the electronic device;
    activating the augmented reality engine depending on an alignment of the at least one characteristic measurement of the real object with the image detected;
    creating a manual, in electronic format;
    associating augmented reality content with the manual using the augmented reality engine;
    entering the manual with the augmented reality content in a server;
    entering in the electronic device a module for accessing the server;
    accessing the manual and the augmented reality engine using the electronic device.

2. The method according to claim 1, and further comprising a step of adjusting the alignment of the at least one characteristic measurement of the real object with the image detected.

3. The method according to claim 2, and further comprising providing that the electronic device comprises a data entry interface, the data entry interface including elements for adjusting the alignment.

4. The method according to claim 2, and further comprising providing that the step of adjusting the alignment occurs during movement of the electronic device relative to the real object.

5. The method according to claim 1, and further comprising providing that the electronic device is portable.

6. The method according to claim 1, and further comprising a step of modifying the augmented reality content of the manual using the module for accessing the server.

7. A system for interactive viewing and management of augmented reality content comprising:
    a server,
    an electronic device,
    a data management unit associable with the server and with the electronic device,
    a recognition module for augmented reality associated with the electronic device, and
    an interface with the recognition module for augmented reality,
    the system configured for carrying out the following steps:
        producing a three-dimensional drawing of a real object;
        defining at least one characteristic measurement of the real object starting from the three-dimensional drawing;
        entering in the electronic device the at least one characteristic measurement of the real object;
        positioning the electronic device in such a way as to view the real object;
        superposing the at least one characteristic measurement of the real object on the image detected;
        aligning the at least one characteristic measurement of the real object with the image detected in such a way as to determine a positioning of the electronic device relative to the real object;
        inserting an augmented reality engine in the electronic device;
        activating the augmented reality engine depending on an alignment of the at least one characteristic measurement of the real object with the image detected;
        creating a manual, in electronic format;

associating augmented reality content with the manual using the augmented reality ermine;

entering the manual with the augmented reality content in the server;

entering in the electronic device a module for accessing the server;

accessing the manual and the augmented reality engine using the electronic device.

8. The method according to claim 3, wherein the elements are touch elements.

9. The method according to claim 1, and further comprising providing that the electronic device is a tablet or a smartphone.

10. The method according to claim 1, and further comprising providing that the electronic device is smart glasses.

11. The method according to claim 1, and further comprising providing that the manual is interactive.

* * * * *